FREQUENCY-SHIFT CARRIER TELEGRAPH SYSTEM

Filed July 29, 1950 3 Sheets-Sheet 1

INVENTORS: J. L. HYSKO
B. OSTENDORF JR.
W. T. REA
E. F. WATSON
BY R. C. Lorry
ATTORNEY

FREQUENCY-SHIFT CARRIER TELEGRAPH SYSTEM

Filed July 29, 1950 3 Sheets-Sheet 2

INVENTORS: J. L. HYSKO
B. OSTENDORF JR.
W. T. REA
E. F. WATSON

BY R. C. Terry
ATTORNEY

INVENTORS: J. L. HYSKO
B. OSTENDORF JR.
W. T. REA
E. F. WATSON
BY R. C. Terry
ATTORNEY Patented July 6, 1954 2,683,189

UNITED STATES PATENT OFFICE 2,683,189

FREQUENCY-SHIFT CARRIER TELEGRAPH SYSTEM

John L. Hysko, Summit, N. J., Bernard Ostendorf, Jr., Stamford, Conn., and Wilton T. Rea, Manhasset, and Edward F. Watson, Larchmont, N. Y., assignors to Bell Telephone Laboratories, Incorporated, New York, N. Y., a corporation of New York Application July 29, 1950, Serial No. 176,724

13 Claims. (Cl. 178—66)

This invention relates to telegraph transmission systems, and particularly to carrier telegraph transmission systems of the frequency shift type, in which marking impulses are represented by transmission of alternating current of one frequency and spacing impulses are represented by transmission of alternating current of another frequency.

An object of the invention is to provide automatically reversible carrier telegraph transmission from either of two or any one of more than two telegraph stations to the other or others.

Another object of the invention is to avoid the introduction of extraneous or garbled characters during the transition from one to the other of transmitting and receiving conditions.

Another object of the invention is to enable any receiving station to break transmission from a station that is sending.

Another object of the invention is to render stations unresponsive to transmission channel echoes of their own transmission.

The invention features a mark-hold circuit arrangement for holding the circuit that impresses received signals on the teletypewriter in rest condition in response to the conditions of outgoing transmission from that station or absence of incoming carrier.

The invention also features the use of the spacing frequency to obtain a break against transmission.

The invention also features an arrangement for temporarily locking-in a received break signal to assure mutilation of copy when stations begin sending substantially simultaneously.

Figure 1:
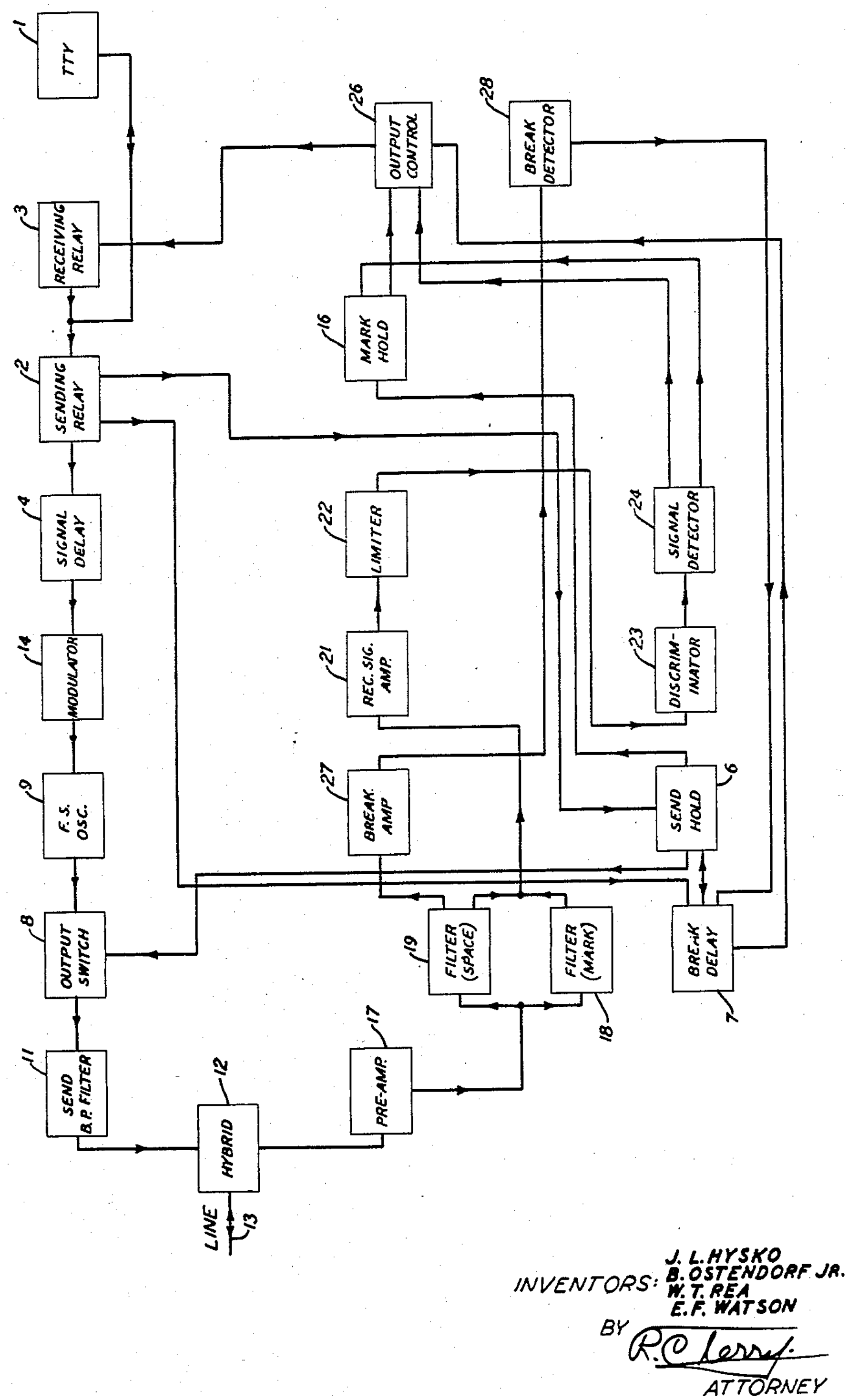
Figure 2:
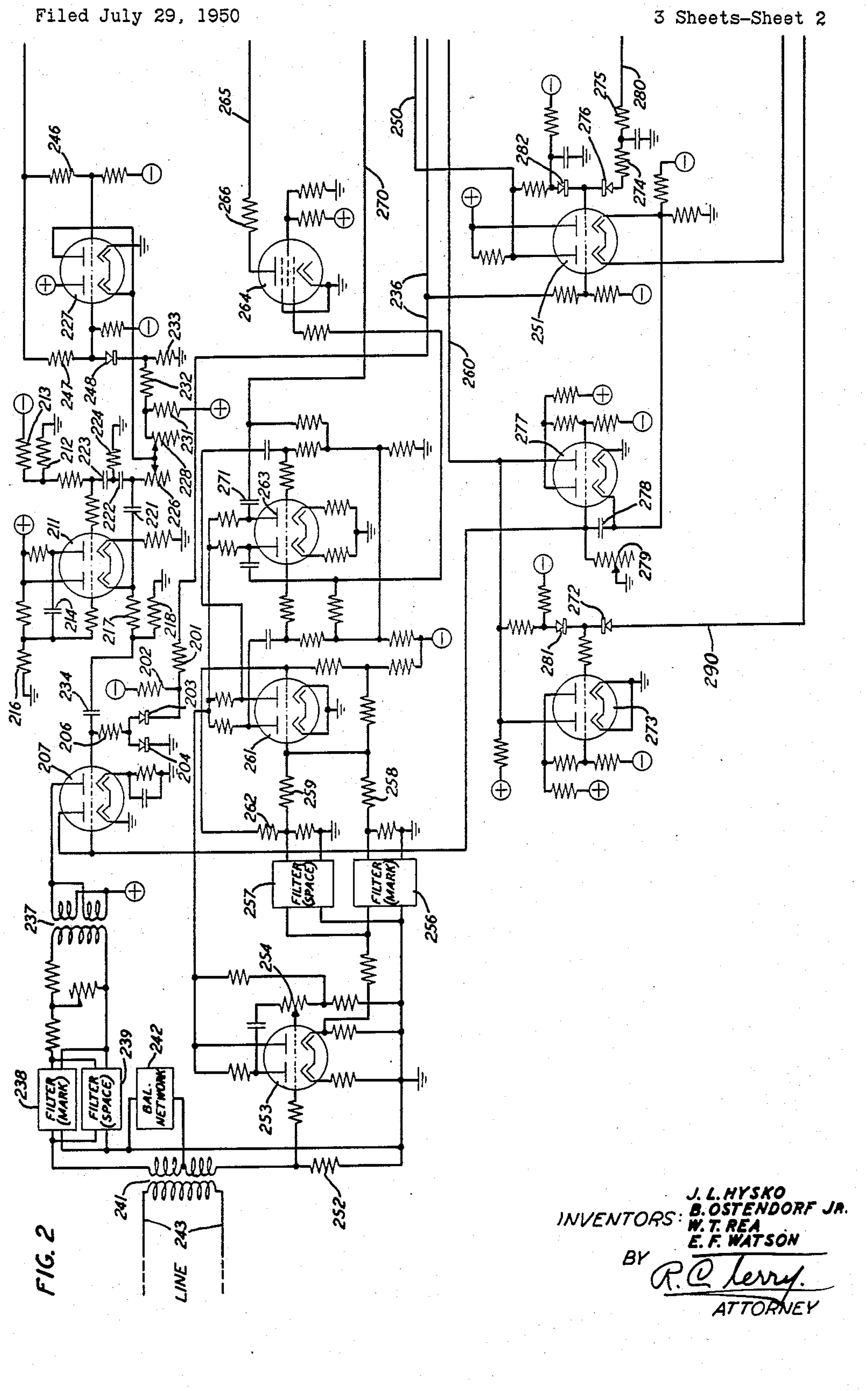
Figure 3:
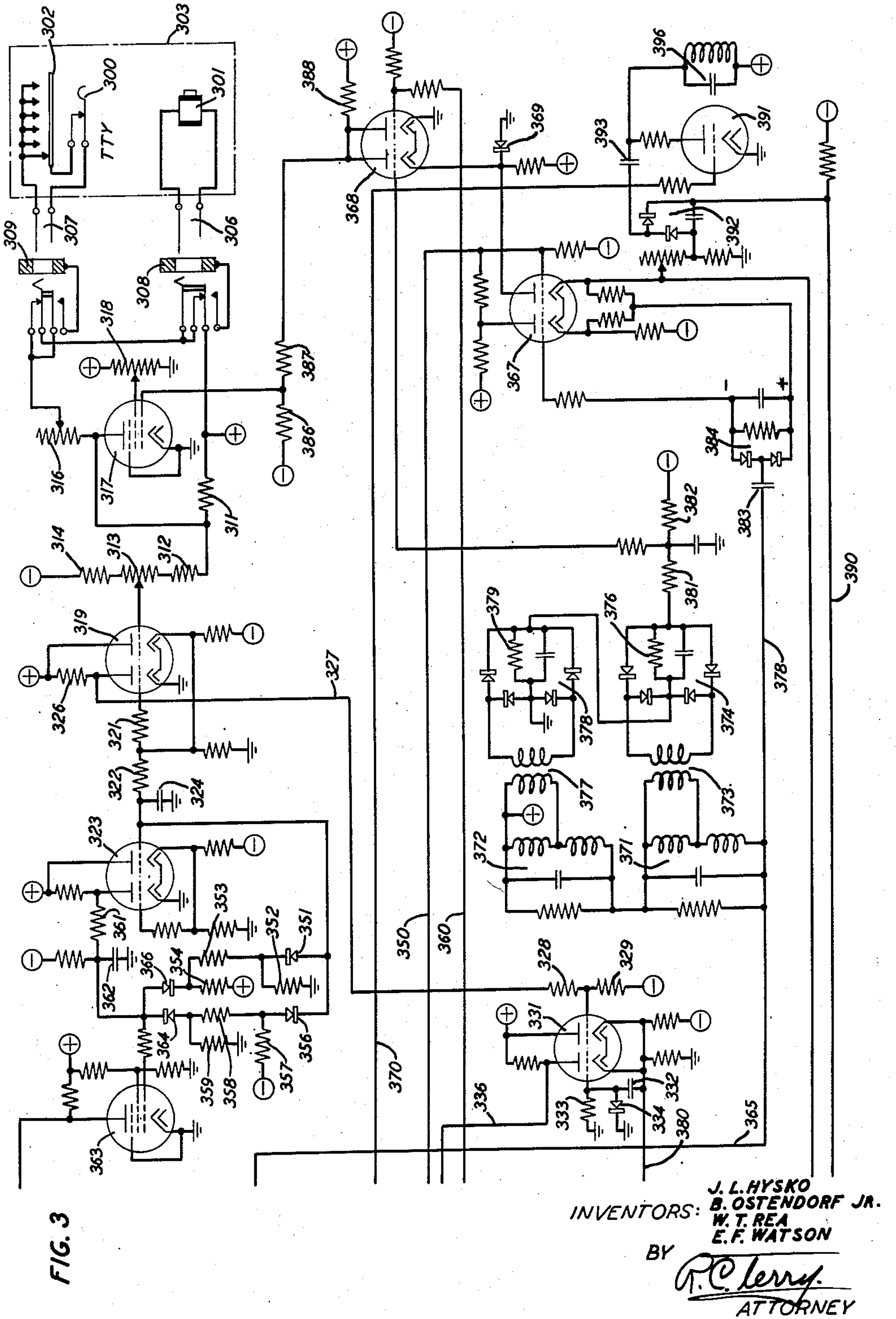

For a complete understanding of the invention reference may be had to the following detailed description to be interpreted in the light of the accompanying drawings in which:

Fig. 1 represents in block diagram form the components of a telegraph station in accordance with a preferred embodiment of the invention; and Figs. 2 and 3, when placed side by side with Fig. 3 at the right of Fig. 2, show the circuits embodying the components of a telegraph station as represented diagrammatically in Fig. 1.

Referring now to the drawings and particularly to Fig. 1, upon which a brief and general description of the invention will be predicated, a teletypewriter 1 which comprises printing telegraph transmitting and receiving equipment is operatively connected to impress marking and spacing signals upon a sending relay 2 and to receive marking and spacing signals from a receiving relay 3, the transmitted and received signals being impressed upon one and the same loop circuit in which teletypewriter 1 is connected. Sending relay 2 repeats the signals transmitted by teletypewriter 1 to a signal delay circuit 4 and also controls a send-hold circuit 6 and a break delay circuit 7.

The send-hold circuit 6 activates an output switch 8 which passes alternating current at the marking or the spacing frequency from a frequency shift oscillator 9, and initially passes the marking frequency, this being the frequency normally generated by the oscillator, through a sending band-pass filter 11 to a hybrid coil 12 through which the marking signal is impressed upon the outgoing telegraph channel 13. Thus a marking signal has been impressed upon transmission channel 13 although sending relay 2 is repeating a spacing signal, namely the start impulse of the first code combination to the signal delay circuit 4.

The signal delay circuit 4, after delaying the mark-to-space transition of the start impulse and all subsequent impulse transitions by about one-half pulse length, passes them to a modulator 14 which modulates the frequency shift oscillator 9 to cause it to transmit alternating current at the spacing and marking frequencies in accordance with the spacing and marking impulses repeated by the sending relay. The momentary marking current that is transmitted preceding signal transmission is effective at stations receiving it to convert those stations from a mark-hold condition to a receiving condition, as will presently be described, to render them responsive to incoming signals. The momentarily transmitted marking current prevents excessive distortion of the first character signal following an idle period, because the line transition from zero signal condition to spacing signal condition differs from the transition from mark to space, and the momentary marking places the line in the marking condition before the mark-to-space transition of the first start pulse occurs. The momentarily transmitted marking current also may exercise a control over line or terminal amplifiers or repeaters. Such amplifiers may be provided with an automatic gain control feature, and since in the idle condition of the stations the frequency shift oscillators 9 are disconnected from the transmission channel 13 at the output switch 8 such amplifiers will be at maximum sensitivity due to absence of carrier. The preliminary transmission of alternating current at the marking frequency readies the amplifiers to repeat the signal impulses at normal rather than excessive amplitudes, thereby avoiding distortion in the start impulse and possibly other impulses of the first character.

The send-hold circuit 6, in addition to activating the output switch 8, also is connected to control the mark-hold circuit 16 to cause it to impose a marking condition on receiving relay 3 during responses of sending relay 2 to spacing signals originated by the transmitter of teletypewriter 1, so that outgoing signals reaching the receiving circuit directly through hybrid coil 12, or as echoes returned over channel 13, shall not be effective upon the receiving relay as are true incoming signals, there being no necessity for response of the receiving relay to these signals because, as will be described hereinafter, local copy of outgoing messages is produced by the receiving teletypewriter under the direct control of the teletypewriter transmitter.

Received signals, comprising the momentary preliminary transmission of marking frequency, followed by the spacing and marking frequencies representing actual character signals, enter hybrid coil 12 from line 13 and are passed to a preamplifier 17. Two filters 18 and 19 are connected to the output of preamplifier 17, the former passing only the marking frequency and the latter passing only the spacing frequency. Both of the filters 18 and 19 pass their frequencies to a receiving signal amplifier 21, where they are amplified and are then amplitude limited in a limiter 22. From the limiter the signals pass to a discriminator and a signal detector, designated by the reference numerals 23 and 24, respectively, and there appears at the output of the signal detector 24 a voltage of one polarity for marking impulses and of the opposite polarity for spacing impulses. The signal voltages produced by signal detector 24 are passed to an output control circuit 26 which passes them to receiving relay 3 which in turn repeats them to teletypewriter 1. Output control circuit 26 is capable of passing the signals to receiving relay 3 only when permitted to do so by mark-hold circuit 16. The control path from send-hold circuit 6 to mark-hold circuit 16 becomes effective during outgoing transmission to cause the mark-hold circuit to render the output control circuit unresponsive to signal output at the signal detector 24. The mark-hold circuit 16 imposes a like condition on output control circuit 26 when there is no outgoing transmission and no incoming carrier of either marking or spacing nature, and the control path from signal detector 24 to mark-hold circuit 16 indicates that there must be signal reception and detection to cause the mark-hold circuit 16 to permit the output control circuit 26 to pass signals to receiving relay 3.

The spacing signals passed by filter 19 are also impressed on a break amplifier 27, the break signal being a prolonged transmission of the spacing carrier frequency. The signals amplified by the break amplifier 27 are detected in break detector 28 and are then impressed upon break delay circuit 7. Each time that sending relay circuit 2 responds to a spacing signal it imposes on the break delay circuit 7 over a control path previously mentioned, a condition representative of the transmission of a spacing signal and the break delay circuit prolongs this condition even after the end of the spacing signal to which sending relay 2 is responding for an interval corresponding with the echo time of the transmission system. If the break delay circuit is responding to a spacing signal received from the break detector circuit 28 when it times out the echo time in connection with the response of sending relay 2 to a spacing signal the break delay circuit 7, through a control path to the output control circuit 26, causes the receiving relay circuit 3 to impose a break on the loop circuit of teletypewriter 1. Upon the imposition of the break signal upon the loop circuit of teletypewriter 1 the send-hold circuit 6 is caused to prolong this break condition for its own delay interval, although the received break signal may terminate. This assures that the break signal shall be impressed on the loop circuit of teletypewriter 1 long enough for the operator to become cognizant of it and in this way transmission is broken up and the operators become cognizant of this breakup when two begin to transmit substantially simultaneously.

With the arrangement described in the foregoing paragraphs, providing as it does for suppression of carrier transmission during idle conditions, and with the station teletypewriters rendered responsive to message transmission by the momentary transmission of marking carrier preceding the first signal of message transmission, a plurality of stations may be associated with the transmission channel 13, any one of them may begin transmitting when the system is idle and all of the others, if actually in operation, will receive the message. Moreover, any one of the stations receiving the message may transmit a break signal which will be received by all stations and will break transmission at the station that is then transmitting.

Referring now to Figs. 2 and 3 for detailed consideration of the circuits, and particularly to Fig. 3, the reference numeral 301 designates the receiving selector magnet of a teletypewriter printer and numeral 302 designates the transmitter, these elements being enclosed in dotted line rectangle 303 which represents the complete teletypewriter transmitter receiver unit. This unit may be of the type shown in Patent 1,904,164 granted April 18, 1933, to S. Morton et al. That patent shows a keyboard transmitter mechanism in combination with a teletypewriter printer. If desired the transmitter 302 may be a tape transmitter, such a transmitter being exemplified in one form in Patent 2,055,567 granted September 29, 1936, to E. F. Watson. The disclosures of these patents are incorporated herein by reference as part of the present specification.

Selector magnet 301 and transmitter 302 have their terminals connected to plugs 306 and 307 that are insertable into jacks 308 and 309, respectively. When the plugs are inserted into the jacks an energizing circuit for selector magnet 301, supplied by the potential difference across resistor 311 of a potential divider comprising resistors 311, 312, 313 and 314 in series between positive and negative terminals of direct-current power supply or battery, is traced from the positive terminal of resistor 311 through the sleeve of jack 308, sleeve terminal of plug 306, winding of selector magnet 301, tip of plug 306, tip contacts of jacks 308 and 309, tip of plug 307, break key 350, transmitter 302, sleeve terminal of plug 307, sleeve of jack 309, variable resistor 316 to the anode of tube 317 and also to the negative terminal of resistor 311. The positive and negative battery or power supply connections indicated in the drawings have those polarities relative to ground which is considered as zero potential. The tube 317 has its cathode connected to ground so that parallel conductive paths through selector magnet 301 as just traced and through resistor 311 join at the anode of tube 317 and extend to ground through that tube. As will be described hereinafter, a positive potential will be assumed to be applied at this time to the grid of tube 317 to render that tube conductive. Positive potential is also applied through variable resistor 318 to the screen of tube 317, and the desired energizing current for selector magnet 301 is established by adjustment of variable resistor 316 and potential divider 318.

The circuit of selector magnet 301 is interruptable by transmitter 302 in accordance with the spacing impulses of signals to be transmitted by the transmitter, and in this manner local copy of transmitted message material is made. With the opening, in this manner, of the conductive path through selector magnet 301 in parallel with resistor 311 the current drawn by tube 317 is supplied only through resistor 311, thereby increasing the drop through this resistor and causing the potential of the plate of tube 317 to decrease to a value near zero. This reduces the flow of current through resistors 312, 313 and 314, thereby carrying the grid of the right-hand triode section of tube 319, which obtains its grid potential from a contactor associated with resistor 313, towards negative and reducing or cutting off the flow of current through that tube. Thus the right-hand triode of tube 319 is conductive at a current value determined by the adjustment of the contactor of resistor 313 for the marking condition of transmitter 302 and is conductive at reduced current value or is cut off for the spacing condition.

The right-hand triode of tube 319 is cathode load coupled through resistor 321 to the grid of the left-hand triode of tube 319 and through resistor 322 to the grid of the right-hand triode of tube 323. The voltage swing of the grids of the left-hand triode of tube 319 and the right-hand triode of tube 323 is toward negative in response to the spacing impulses, which is the same as the voltage swing of the grid of the right-hand triode of tube 319, because of the cathode drive from the right-hand cathode of tube 319, it being well understood that there is no inversion of signals in a cathode output circuit. Resistor 322, in combination with condenser 324 which is connected between the grid of the right-hand triode section of tube 323 and ground forms a delay circuit for delaying the response of the right-hand triode section of tube 323 to the mark-to-space and space-to-mark transitions. There is no delay in the response of the left-hand triode of tube 319 to the signal transitions so the response of that triode to the first signal impulse, which will be presumed to be the mark-to-space transition initiating the start impulse of the first code combination to be transmitted, will be described first.

The left-hand triode of tube 319 is direct coupled from its anode load resistor 326 through conductor 327 and resistor 328 to the grid of the right-hand triode section of tube 331, the grid being returned to negative through resistor 329, the resistors 326, 328 and 329 forming a potential divider between positive and negative power supply or battery connections. A signal inversion takes place in the left-hand triode of tube 319 because the output is derived from the anode of the tube so that as the grid of the left-hand triode section of tube 319 swings toward negative in response to the mark-to-space transition the conductivity of that section of the tube is decreased, the anode potential swings toward positive and the grid of the right-hand triode section of tube 331 which is coupled to it also swings toward positive, increasing the conductivity of the right-hand triode section.

The right-hand triode of tube 331 is cathode load coupled through condenser 332 to the grid of the left-hand triode of that tube, which has a grid-leak resistor 333 shunted by unidirectional conducting device or varistor 334. The left-hand triode of tube 331 is the send-hold circuit heretofore referred to in the description of the block diagram drawing by the reference numeral 6. The combination of condenser 332, resistor 333 and varistor 334 with the grid of the left-hand triode of tube 331, cathode driven from the right-hand triode is the equivalent of a fast operate and slow release relay, the left-hand triode being quickly cut off with consequent positive plate swing in response to a mark-to-space transition, manifested by a positive swing of both cathodes as the conductivity of the right-hand triode increases, and being delayedly rendered conductive in response to a space-to-mark transition, manifested by a negative swing of both cathodes as the conductivity of the right-hand triode decreases. The reason that the left-hand triode of tube 331 is immediately cut off as the cathodes swing toward positive is that condenser 332 quickly charges through the forward (low) resistance of varistor 334, resulting in no flow of charging current through resistor 333, wherefore the grid of the left-hand triode of tube 331 remains at ground potential. When, at the end of the spacing signal the cathodes of the tube swing toward negative the grid of the left-hand triode of tube 331 correspondingly swings toward negative, maintaining the left-hand triode cut off until the charge on condenser 332 has leaked off through resistor 333. Preferably the time constant of resistor 333 and condenser 332 is such that the left-hand triode of tube 331 remains cut off during marking signal intervals normally occurring during substantially steady transmission so that it is restored to conductivity only after the termination of transmission.

The left-hand triode of tube 331 having been cut off, the positive voltage swing of its anode is applied over conductors 336 and 236 and through resistors 201 and 202 through varistor 203 to a divider, the other arm comprising resistor 202 connected to negative power supply or battery terminal, the driving connection from the anode of the left-hand triode of tube 331 being continued from the junction of potential divider resistors 201 and 202 through caristor 203 to a junction with an oppositely poled varistor 204 and thence through grid resistor 206 to the grid of the right-hand triode section of tube 207.

The right-hand triode of tube 207 is the output switch previously identified by the reference numeral 8 in the description of Fig. 1. With the left-hand triode of tube 331 conductive prior to the spacing signal transition of sending relay tube 319 and the send-hold and control tube 331 the voltage applied from the left-hand anode of tube 331 through varistor 203 to the junction point with varistor 204 and thence through grid resistor 206 to the right-hand grid of tube 207 is such as to hold the right-hand triode of the tube completely cut off to suppress the transmission of carrier current from the oscillator.

The oscillator circuit, identified in Fig. 1 by the reference numeral 9, is comprised of the tube 211 and associated resistors, condensers and battery or power supply connections. The right-hand triode section of the tube, having an anode load resistor and an unbypassed cathode resistor, operates as an amplifier. Its grid is slightly negative with respect to ground by virtue of the potential divider comprising resistors 212 and 213, which causes current to flow to bring the right-hand cathode to nearly the same positive potential relative to ground. The right-hand anode of tube 211 is resistance-capacity coupled to the grid of the left-hand triode section through condenser 214 and grid return resistor 216 which is connected to ground. The left-hand triode of tube 211 has its load in the cathode circuit, comprising resistors 217 and 218 and the cathode is coupled through a ladder type feedback network comprising capacity series arms and resistive shunt arms to the grid of the right-hand triode section. Condensers 221, 222 and 223 are included in the capacity arms, and shunt resistor 224 is connected from the junction of condensers 222 and 223 to ground. From the junction of condensers 221 and 222 a variable resistor 226 is connected to the left-hand cathode and right-hand anode of twin triode modulator tube 227. From these electrodes of tube 227 another variable resistor 228 is connected to the junction of resistors 231 and 232 which, with resistor 233, form a potentiometer with the free end of resistor 231 connected to the positive terminal of battery or power supply and the free terminal of resistor 233 connected to ground.

The circuit oscillates at the frequency at which the phase shift through the feedback network from the left-hand cathode to the right-hand grid of tube 211 is 180 degrees. Variable resistor 226 is provided for adjusting the oscillator frequency to the marking signal frequency, which may, for example, be 1445 cycles per second. Variable resistor 228 provides for adjusting the spacing frequency, which may, for example, be 1275 cycles. The manner in which the modulator tube 227 controls the oscillator circuit to cause either the marking or the spacing frequency to be generated will be described hereinafter.

The left-hand triode of oscillator circuit tube 211 is cathode coupled from the junction of cathode resistors 217 and 218 through condenser 234 to the grid of the right-hand triode of output switch tube 207. Prior to the response of send-hold tube 331 to the spacing start impulse the right-hand triode of tube 207 is held cut off so that a marking frequency impressed through condenser 234 on the right-hand grid of tube 207 is not passed through the tube. Upon the raising of the grid potential of the right-hand triode of tube 207 by send-hold tube 331, to render the right-hand triode of tube 207 conductive, the marking frequency applied to the right-hand grid of tube 207 varies the anode current in that section of the tube, causing the marking frequency to be amplified and impressed on the primary of output transformer 237. The secondary of the output transformer 237 is connected through a sending level control network to the input terminals of marking and spacing frequency band-pass filters 238 and 239, respectively. The output of the two filters 238 and 239 is connected to hybrid coil 241 which has its center tap connected to ground through a balancing network 242. From hybrid coil 241 the marking signal which is being passed by the right-hand triode of tube 207 is impressed on line conductors 243. In Fig. 1 the hybrid coil is designated by reference number 12 and the line is designated 13.

Returning to consideration of tube 323, it was previously stated that signals on the cathode of the right-hand triode of tube 319 are impressed upon the right-hand grid of tube 323 through a delay network comprising resistor 322 and condenser 324. The right-hand grid of tube 323 is connected through a varistor 351 to the junction of resistors 352 and 353 of a potentiometer comprising resistors 352, 353 and 354 connected in series between ground and the positive terminal of battery or power supply. The same grid is connected through oppositely poled varistor 356 to the junction of resistors 357 and 358 of a potential divider comprising resistors 357, 358 and 359 connected in series between the negative terminal of battery or power supply and ground. Potentials applied from these potential dividers through these varistors to the grid of the right-hand triode section of tube 323 limit the marking and spacing voltage swings of that grid under the control of the right-hand cathode of tube 319 to insure that with the shortest pulses that the circuit is designed to transmit the potential on the right-hand grid of tube 323 reaches a fixed steady state value before another signal transition is applied to the right-hand grid of tube 323 from the right-hand cathode of tube 319.

The right-hand triode of tube 323 has its load impedance in the cathode circuit which is coupled to the grid of the left-hand triode of that tube, so that the sloping front signals passed by the delay network comprising resistor 322 and condenser 324 and voltage limited by varistors 351 and 356 are amplified and squared up by the left-hand triode of tube 323. This triode has its load impedance in the anode circuit which is coupled through a delay network comprising resistor 361 and condenser 362 to the grid of pentode tube 363. The voltage swings of the control grid of this tube are limited by oppositely poled varistors 364 and 366 connected to the junction of resistors 358 and 359 and the junction of resistors 353 and 354, respectively. In the delay network comprising resistor 361 and condenser 362 the delay is extended to an aggregate of about one-half of a signal impulse and the signal is further amplified in tube 363 which has its load impedance in the anode circuit which is connected through current limiting resistors 246 and 247 to the grids of the right and left-hand triodes, respectively, of modulator tube 227. The circuits of tubes 323 and 363 comprise the signal delay circuit designated by reference numeral 4 in Fig. 1 and the circuits of tube 227 comprise the modulator designated 14 in Fig. 1.

It was previously stated that the grid of right-hand triode of sending relay tube 319 swings toward negative in response to spacing signals and toward positive in response to marking signals. Since it is assumed that the start impulse of a code combination is being transmitted, the grid of the right-hand triode section of tube 319 has swung toward negative, and because cathode output is derived from that section of the tube and is applied to the grid of the right-hand triode section of tube 323, the right-hand cathode of tube 319 swings toward negative and carries with it, after the delay interval, the right-hand grid of tube 323. Cathode output is taken from the right-hand triode of tube 323 to the left-hand grid of that tube so that the right-hand cathode swings toward negative and carries with it the left-hand grid of the tube. Anode output is taken from the left-hand triode of tube 323 so that as the left-hand grid swings toward negative the anode current is reduced and the anode potential swings toward positive, this positive swing being applied to the control grid of tube 363. This increases the conductivity of tube 363 and since anode output is derived from the tube the anode potential swings toward negative, carrying with it grids of modulator tube 227. The swing is sufficient to cut off tube 227, this tube being conductive for the idle and for the marking condition. The two triode sections of tube 227 have their anode-cathode discharge paths in series, the path being traced from positive terminal of power supply or battery on the left-hand anode, thence to the left-hand cathode, thence to the right-hand anode, and finally to the right-hand cathode and ground. As previously stated, the right-hand anode and left-hand cathode are connected to the contactors of the variable resistors 226 and 228. Two paths may be traced from these contactors to positive battery, one including the discharge path of the left-hand triode section of tube 227 and the other including a portion of resistor 228 and the whole of resistor 231. Also, two paths may be traced from these contactors to ground, one including the discharge path of the right-hand triode of tube 227 and the other including a portion of resistor 228 and the whole of resistors 232 and 233 in series. Thus the two discharge paths of tube 227 are shunted across a portion of the frequency determining resistance in the oscillator circuit.

Prior to the application of the mark-to-space transition to the grids of tube 227, the left-hand grid of the tube is connected to a potential of approximately 48 volts positive with respect to ground as determined by conduction in a varistor 248 connected to the junction of resistors 232 and 233 of the potential divider comprising resistors 231, 232 and 233. The potential applied to the right-hand grid of tube 227 prior to the signal transition is such as to cause a current substantially at the saturation value in that triode section and the same current flows in the left-hand triode section, but this current is below the saturation value for the left-hand triode because that triode has a higher plate potential, since the two discharge paths are in series and the left-hand anode is connected to the positive battery or power supply terminal. Thus negative feedback in the left-hand triode of tube 227 causes its cathode to be held very close to a potential of 50 volts positive relative to ground.

When the grids of tube 227 swing negative in response to the mark-to-space transition, the swing is sufficient to cut off both sections of the triode. This amounts to opening of the low resistance shunt that was connected around the frequency determining resistance in the oscillator circuit when the tube 227 was conductive and the effect of the opening of the shunt path is to shift the oscillator frequency from the marking to the spacing frequency. This frequency is passed through the output switch comprising the right-hand triode of tube 207 and through transformer 237, filter 239 and hybrid coil 241 to the transmission line 243. Resistor 232 is very small compared to resistors 231 and 233, so that the potential at the junction of resistors 231 and 232 is only slightly higher than the 48-volt limiting potential on the left-hand grid of tube 227, supplied through varistor 248, and is in fact approximately 50 volts. Thus the oscillator tuning resistances are returned to a potential having a value of approximately 50 volts positive with respect to ground at the junction of resistors 231 and 232 only, when tube 227 is cut off, or to that potential at that potentiometer point and to a like potential also at the left-hand cathode of tube 227 when that tube is conducting. Thus the cutting off and restoring of conductivity in tube 227 to vary the tuning of the oscillator by the opening and closing of the shunt path around its frequency determining resistors is accomplished without significant variation in the potential applied to those resistors.

Upon the occurrence of the first space-to-mark transition after the start impulse, tube 227 is again rendered conductive to shift the frequency of the oscillator to the marking value. During each marking impulse, tube 227 is conductive and the oscillator circuit produces the marking frequency, and during each spacing impulse tube 227 is cut off and the oscillator circuit generates the spacing frequency. This continues until transmission ceases.

It should be noted that when the left-hand triode of send-hold tube 331 had its conductivity reduced or cut off in response to the mark-to-space transition of the first start impulse, and applied a positive voltage swing to the grid of the right-hand triode of tube 207 to pass the output of the oscillator circuit to transmission line 243, a similar positive voltage swing was applied over conductor 236 to the grid of the left-hand triode of tube 251. The left-hand triode of tube 251, which is normally cut off, is rendered conductive, to apply a negative voltage swing over conductor 250 and conductor 350 to the grid of the right-hand triode of mark-hold tube 367. This cuts off the right-hand triode of tube 367 which applies a positive voltage swing to the cathode of the left-hand triode of output control tube 368 that is sufficient to cut off this triode, thereby rendering it unresponsive to signals applied to its grid. This grid is under the control of the signal receiving circuit, as will presently be described, and because the signal output, the signal input and the transmission line are interconnected through hybrid coil 241, the receiving circuit responds to the outgoing signals and they are amplified, detected and impressed on the left-hand grid of output control tube 368 in the same manner as incoming signals. With the left-hand triode of this tube held at cut-off during outgoing transmission by the send-hold tube 331 through the left-hand triode of tube 251 and the right-hand triode of tube 367, the control grid of receiving relay tube 317, which is coupled to both anodes of tube 368, is maintained in the marking condition. The right-hand triode of tube 368 is employed for registering the reception of a break signal, as will be described hereinafter.

At the end of message transmission, the right-hand triode of tube 331 remains in a steady marking signal condition for a sufficient interval of time for the left-hand triode of tube 331 to become conductive, and this triode cuts off the right-hand triode of output switch tube 207, thereby suppressing the transmission of carrier current representing the stop or rest condition of the final signal code combination. The left-hand triode of tube 331 also cuts off the left-hand triode of tube 251 which in turn restores to conductivity the right-hand triode of tube 367. This triode in turn restores the left-hand triode of tube 368 but because no signals are appearing in the output of the receiving circuits, the left-hand triode of tube 368 does not become sufficiently conductive to impress a spacing voltage swing on the control grid of receiving relay tube 317.

It will now be assumed that message transmission is initiated at a remote station, the signals being received over the line conductor 243. A first signal received is a momentary interval of marking carrier followed by the spacing carrier representing the start impulse of the first code signal. Received signals appear across resistor 252 included in the circuit of hybrid coil 241 and these signals are amplified in preamplifier tube 253 comprising two triodes, the left-hand triode being a voltage amplifier to the anode of which the right-hand grid is coupled through gain control 254. The output of the right-hand triode is derived from the cathode and is impressed on band-pass filters 256 and 257 which pass the marking and spacing carrier frequencies, respectively.

The outputs of the marking and spacing filters 256 and 257 are coupled through resistors 258 and 259, respectively, to the grid of the left-hand triode of tube 261 so that both frequencies are amplified in that triode. The output of the spacing filter 257 only is also coupled through resistor 262 to the grid of the right-hand triode section of tube 261 so that the spacing frequency only is amplified in that triode. The left-hand anode of tube 261 is coupled to the grid of the left-hand triode section of tube 263 for additional amplification of the marking and spacing frequencies and the right-hand anode of tube 261 is coupled to the grid of the right-hand triode section of tube 263 for additional amplification of the spacing frequency. The reason for separate amplification of the spacing frequency is for the purpose of detecting break signals, as will be described hereinafter. The anode of the left-hand triode of tube 263, in which both the marking and spacing frequencies are amplified, is coupled to the control grid of pentode tube 264 which is operated as an amplitude limiter.

The anode circuit of tube 264 is traced through resistor 266, conductors 265 and 365 and parallel resonant circuits 371 and 372 connected in series, the circuit terminating at positive battery or power supply terminal. Resonant circuits 371 and 372 together comprise a frequency discriminator, substantially all of the output voltage appearing across resonant circuit 371 when the marking carrier frequency is being applied to the control grid of limiter tube 264 and practically all of the output voltage appearing across resonant circuit 372 when the spacing carrier frequency is being applied to the control grid of limiter tube 364. Resonant circuit 371 is coupled through transformer 373 to a signal detector circuit 374 which is a full wave bridge rectifier circuit having output load resistor 376. Resonant circuit 372 across which a signal voltage is developed in response to the spacing carrier frequency is connected by transformer 377 to signal detector circuit 378 which is a full wave bridge rectifier circuit having output load resistor 379. Resistors 376 and 379 are included in a rectifier biasing circuit traced from ground through these resistors, and resistors 381 and 382 to negative battery or power supply terminals. The operation of the detector circuits 374 and 378 is such that there appears at the junction of resistors 381 and 382 a voltage that is negative relative to ground for marking signals and positive relative to ground for spacing signals. These signal voltages are applied to the grid of the left-hand triode of output control tube 368.

From conductor 365 in the output circuit of limiter tube 264 a path is traced through conductor 378, coupling or blocking condenser 383, to a voltage doubler circuit 384. This circuit is non-frequency discriminatory so that a direct-current output voltage is maintained when limiter tube 264 is responding to either the marking or the spacing frequency of carrier. The negative terminal of the voltage doubler circuit 384 is connected to the grid of the left-hand triode of mark-hold tube 367 and this voltage is sufficiently negative with respect to the cathode to cut off the left-hand triode. The cutting off of current in the left-hand triode of tube 367 is accompanied by a swing of its anode toward positive, and the anode is coupled to the grid of the right-hand triode of that tube to cause the right-hand triode to conduct. The potential of the right-hand anode of tube 367 swings toward negative when that triode begins to conduct, carrying with it the cathode of the left-hand triode of output control tube 368. With the cathode at this potential, the positive potential applied to the grid from the junction of resistors 381 and 382 in response to spacing signals causes sufficient current flow and consequent negative voltage swing of the left-hand anode of tube 368 to cut off receiving relay tube 317 which has its control grid connected to the junction of resistors 386 and 387 which are connected in series between negative and positive battery or power supply terminals as a potential divider, the left-hand anode of tube 368 being connected to the junction of resistors 387 and 388. Tube 368 is conditioned by tube 367 to control receiving relay tube 317 in accordance with the marking and spacing impulses of received telegraph signals as long as rectified carrier at the output of rectifier circuit 384 holds the left-hand triode of tube 367 cut off.

When signal reception ceases, no voltage appears across the output of rectifier circuit 384, the left-hand grid of tube 367 swings toward positive, and the left-hand triode of the tube again becomes conductive, cutting off the right-hand triode. This is the same condition that was imposed on the right-hand triode of tube 367 over conductor 350 under the control of the send-hold tube 331 during outgoing transmission, and results in a positive potential on the cathode of the left-hand triode of tube 368 such that that tube is cut off. With the left-hand triode of tube 368 cut off the control grid of receiving relay tube 317 receives a potential on its control grid corresponding to a marking signal and thus holds the loop circuit including teletypewriter selector magnet 301 energized in the marking condition. The mark-hold tube 367 thus imposes a marking condition on the left-hand triode of relay 368 during intervals of outgoing transmission and during absence of received carrier.

It will now be assumed that while outgoing transmission is in progress from the station shown in Figs. 2 and 3, a break signal, comprising an interval of spacing carrier longer than ordinary spacing signal impulses, is received from a remote station. Amplified carrier of spacing frequency appears at the anode of the right-hand triode of amplifier tube 263, as previously stated, and this anode is coupled through condenser 271 and conductors 270 and 370 to the grid of break detector tube 391. The spacing carrier is amplified in tube 391, network 396 in the anode circuit providing additional discrimination against the marking frequency, and is rectified in half-wave rectifier circuit 392, which is coupled to the anode circuit of tube 391 through blocking or coupling condenser 393, to produce at the output of the rectifier circuit a positive voltage. This voltage is applied over conductors 390 and 290 and through varistor 272 to the grid of the right-hand triode of tube 273. This triode is part of a break delay circuit, identified by reference numeral 7 in Fig. 1, and which will now be described.

The receiving circuit must be capable of responding to incoming spacing break signals when transmission is in progress. In order to prevent false breaks due to echoes of outgoing spacing signals it is necessary to introduce delay into the break path so as to delay the registration of a break signal until echoes of ordinary spacing signals have been dissipated.

During outgoing transmission the mark-to-space and space-to-mark transitions produced at the cathodes of tube 331 are applied over conductors 380 and 280 and through resistors 275 and 274 and varistor 276 to the grid of the right-hand triode of tube 251, and these transitions appear at the right-hand cathode of tube 251 as a positive voltage swing for the spacing impulses and negative voltage swing for the marking impulses. These voltage swings are applied to the cathode of the left-hand triode section of tube 277. This cathode is coupled to its grid through condenser 278 and the grid is returned to ground through variable resistor 279 and also through the diode-connected left-hand triode section of tube 207. The arrangement is like that of the send-hold circuit, in that condenser 278 corresponds to condenser 332, variable resistor 279 corresponds to resistor 333 and the diode-connected left-hand triode of tube 207 corresponds to varistor 334. A positive voltage swing applied from the right-hand cathode of tube 251 to the left-hand cathode of tube 277 in response to a mark-to-space transition of outgoing signals cuts off the left-hand triode of tube 277 and it remains cut off for the duration of the spacing signal and for an interval thereafter of sufficient duration to cover the longest spacing signal echo, the amount of delay being controlled by variable resistor 279. The anode of the left-hand triode of tube 277 is coupled to the grid of the right-hand triode and with the cutting off of the left-hand triode the anode thereof swings toward positive, applying a voltage swing in the positive direction to the grid of the right-hand triode and increasing the current flow through the right-hand triode of tube 277.

The right-hand anode of tube 277 swings toward negative as the conductivity of the triode increases and this voltage swing is applied over conductors 260 and 360 to the grid of the right-hand triode section of output control tube 368. This is for the purpose of preventing the right-hand triode of tube 368 from being rendered conductive.

As previously stated, a rectified spacing signal applied to the right-hand grid of tube 273 through varistor 272 increases the current flow in the right-hand triode of that tube. The right-hand anode swings toward negative, and since the grid of the left-hand triode of that tube is coupled to the right-hand anode, current in the normally conductive left-hand triode is cut off and its anode swings positive. This anode is connected over conductors 260 and 360 to the right-hand grid of tube 368 but the right-hand triode of that tube is held cut off or at low conductivity because the right-hand anode of tube 277 has swung toward negative.

When the left-hand triode of tube 277 times out the break delay interval, the left-hand triode becomes conducting and cuts off the right-hand triode. Under the assumed condition that the left-hand triode of tube 273 remains cut off because the received spacing frequency which has produced an output voltage at rectifier 392 is in fact a break signal, the grid of the right-hand triode of tube 368 will be swung toward positive to cause the tube to conduct and reduce the potential of the control grid of receiving relay tube 317, thereby registering a spacing signal in teletypewriter selector magnet 301. In this way, a received spacing frequency which continues after the timing out of the break delay circuit imposes a break on the teletypewriter loop.

With the left-hand triode of tube 273 and the left-hand triode of tube 277 cut off and impressing a positive potential on the right-hand grid of tube 368 to register the break signal in the teletypewriter loop, the positive potential is also applied through varistor 281 to the right-hand grid of tube 273 to maintain the right-hand triode conductive even though the break signal may have terminated with consequent removal of the positive potential applied through varistor 272. With the right-hand triode of tube 273 remaining conductive the left-hand triode remains cut-off and this triode has thus locked itself in the cut-off condition, maintaining the spacing signal applied to the teletypewriter loop under the control of the right-hand triode of tube 368.

With receiving relay tube 317 cut off there is very little voltage drop across resistor 311, whether the loop circuit is open or closed at the transmitting contacts 302, because the total resistance of resistors 312, 313 and 314 is very high compared to that of resistor 311. This causes a positive voltage swing of the right-hand grid of tube 319 to cause a marking signal transmission condition in the transmitting circuit while a received spacing signal is impressed on the teletypewriter loop, whether or not transmitter 302 is being operated. In this way outgoing transmission is interrupted by the response of the receiving teletypewriter loop to a break signal. The steady marking signal condition imposed on the left-hand triode of tube 319 is repeated by the left-hand triode of that tube, and through the right-hand triode of tube 331 to the left-hand triode of that tube and to the right-hand triode of tube 251. The right-hand triode of tube 251 is thus held in the marking condition and the initiation of another timing-out cycle of the break delay circuit comprising the left-hand triode of tube 277 is prevented. In addition, the left-hand triode of tube 331 which is the send-hold circuit, is permitted to time out and restore to its condition of no outgoing signal transmission. The timing out interval is at least as long as the longest spacing signal occurring in ordinary message transmission, and may be as long as the interval of several character signals in succession and in any event, should be long enough to indicate the fact that the distant station is trying to break in. At the end of the timing out interval the left-hand triode of tube 331 becomes conductive and the voltage of its anode swings negative, cutting off the right-hand triode of tube 207 to suppress the transmission of carrier and also cutting off the left-hand triode of tube 251. The left-hand anode of tube 251 swings positive and applies a positive potential through varistor 282 to cause the right-hand triode of tube 251 to conduct. This condition of the right-hand triode of tube 251 is the equivalent of that produced by the response of send-hold tube 331 to a transmitted spacing signal, and produces a positive voltage swing of its cathode, which is applied to the left-hand cathode of break delay tube 277 to cut off that triode, the right-hand triode thereby being rendered conductive.

With the right-hand triode of tube 277 conductive, the anode swings toward negative, carrying with it the right-hand grids of tubes 273 and 368. Tube 368 restores conductivity to tube 317, thereby terminating the break signal applied to teletypewriter selector magnet 301. The negative voltage swing applied to the right-hand grid of tube 273 effects an unlocking of that tube, the right-hand triode being cut off and the left-hand triode restored to conductivity.

The response of a station which is in the receiving condition to a break signal is different. When a station receives any spacing signal, that signal, in addition to being amplified and detected along with the marking signals in the manner hereinbefore described, is also amplified by tube 391 and is rectified by rectifier circuit 392 to impress a positive potential through varistor 272 on the right-hand grid of tube 273. The right-hand triode of tube 273 in turn cuts off the left-hand triode but this does not lock the tube 273 in this condition by applying a positive potential through varistor 281 to the right-hand grid of the tube because the left-hand triode of tube 251 is held cut off by the send-hold tube 331, the right-hand triode of tube 251 is held conductive by a positive potential applied through varistor 282 to the right-hand grid, a corresponding positive potential supplied from the cathode of the right-hand triode of tube 251 to the cathode of the left-hand triode of tube 277 holds that triode cut off and the positive potential at the left-hand anode of tube 277 holds the right-hand triode of that tube conductive. With the right-hand triode of tube 277 conductive tube 273 cannot become locked up with the right-hand triode conductive and the left-hand triode cut off, nor can the right-hand triode of output control tube 368 be rendered conductive although the left-hand triode of tube 273 is cut off. The break signal will merely be repeated by the left-hand triode of tube 368 to receiving relay tube 317 the same as any other received spacing signal and at the end of such break signal the right-hand triode of tube 273 will be cut off and the left-hand triode will be rendered conductive.

The break delay circuit and associated break signal circuits provide for complete interruption of transmission in the event that two stations begin transmitting substantially simultaneously. This results from the fact that the break delay circuit is not required to time out over a period sufficiently long to clearly distinguish a break signal from an ordinary received spacing signal, but is required to time out only over an interval to accommodate the longest probable echo of outgoing spacing signals. As previously set forth, a break signal is registered upon the right-hand grid of tube 368 only under the condition that both the left-hand triode of tube 273 and the right-hand triode of tube 277 are cut off. The latter triode cuts off only after the break delay time-out following restoration of the negative potential on the left-hand cathode of tube 277 by a reduction in conductivity of the right-hand triode of tube 251 as conductivity is reduced in that triode due to response of the right-hand triode of tube 331 to an outgoing marking signal. During a steady marking interval comprising a succession of marking elements of an outgoing character signal such as letters (elements one, two, three, four, five and stop all of marking nature) or V (elements two, three, four, five and stop all of marking nature) the break delay circuit may nearly or completely time out and restore conductivity in the left-hand triode of tube 278, thereby cutting off the right-hand triode of tube 277. If a spacing signal, even of short duration, should be received under this condition and before the next mark-to-space transition of outgoing signals, it will be amplified in tube 391, rectified in rectifier circuit 392, and applied as a positive potential on the grid of the right-hand triode of tube 273, rendering that triode conductive and cutting off the left-hand triode whereby a positive voltage swing would be applied to the right-hand grid of output control tube 368 immediately or as soon as the break delay circuit had completed its time out, as the case might be, to impress the received spacing signal on the teletypewriter loop and to lock in that spacing signal by virtue of the locking potential applied to the right-hand grid of tube 273 through varistor 281. The received and locked in spacing signal applied to the teletypewriter loop would prevent the recording of characters corresponding to characters of attempted transmission at the transmitter 302 and the operator, noting failure to produce home copy of those signals, would know that a break or other spacing signal had been received and locked in, thereby at once suspending outgoing transmission other than a steady marking carrier which would continue until the send-hold circuit had timed out, restored the teletypewriter loop to marking condition and cut off outgoing marking carrier. Similar interruption of outgoing transmission might possibly occur at the other station at which transmission had been started, whereupon message transmission may be restarted from the beginning from one of the stations in accordance with preestablished rules concerning order of precedence among stations where two have attempted to transmit simultaneously. The important point is that a prompt and complete breaking up of simultaneous transmission shall occur, so that each of the two stations shall not continue to transmit for an extended period of time without knowledge that the other is also transmitting. This is accomplished by the break signal responsive circuits as herein described.

Although a particular embodiment of the invention has been shown in the drawings and described in the foregoing specification, the invention is not limited to such embodiment but is capable of modification, rearrangement and substitution of parts and elements without departing from the spirit of the invention.

What is claimed is:

1. In telegraph system including a transmission channel normally having no current flowing therein, intelligence signal transmission means for impressing marking and spacing currents having different characteristics upon said channel, and means for impressing on said channel as an automatically produced result of the initiation of operation of said intelligence signal transmission means and concomitantly with said operation a preliminary marking current preceding said intelligence signal transmission currents.

2. In a telgraph system including a transmission channel normally having no current flowing therein, intelligence signal transmission means for impressing marking and spacing signal currents having different frequencies upon said channel, and means effective as an automatically produced result of initiation of operation of said intelligence signal transmission means and concomitantly with said operation for impressing on said channel ahead of the first intelligence signal transition a preliminary interval of marking frequency current so that all of the intelligence signal transitions including the first shall be from one to another of said frequencies.

3. In a telegraph system including a transmission channel normally having no current flowing therein, intelligence signal generating means for producing marking and spacing conditions of intelligence signals, a source of signaling current to be impressed on said channel, means for modulating said source in accordance with the marking and spacing conditions of intelligence signals, means effective upon initiation of operation of said intelligence signal generating means for transmitting signaling current from said source to said channel, and delay means intervening said intelligence signal generating means and said modulating means for providing an interval of preliminary transmission from said signaling current source before modulation thereof by said intelligence signals.

4. In a telegraph station, telegraph signal generating means, relay means controlled by said signal generating means for causing outgoing transmission of generated telegraph signals, a teletypewriter printer responsive to said telegraph signal generating means, other relay means for operating said teletypewriter printer in response to incoming signals, and holding means controlled by the first-mentioned relay means for suppressing operation of said other relay means in response to outgoing signal transmission.

5. In a telegraph station, a carrier current signal transmitting circuit, a telegraph transmission channel coupled to said transmitting circuit, a carrier current signal receiving circuit coupled to said transmitting circuit and said channel so as to respond to outgoing and incoming carrier current signals, a teletypewriter printer, relay means operable by said receiving circuit for operating said printer, and holding means controlled by said transmitting circuit for precluding operation of said relay means during operation of said transmitting circuit.

6. In a telegraph station, a signal receiving circuit responsive to outgoing signal transmission and incoming signal transmission, a teletypewriter printer, signal responsive relay means for operating said printer in accordance with the marking and spacing character of signals, holding means for disabling said relay means upon the occurrence of outgoing signal transmission, and break signal detecting means operable upon response of said receiving circuit to a spacing signal exceeding a predetermined duration for rendering said relay means and consequently said printer responsive to said spacing signal despite outgoing transmission.

7. In a telegraph station, a signal receiving circuit responsive to outgoing signal transmission and incoming signal transmission, a teletypewriter printer, signal responsive relay means for operating said printer in accordance with the marking and spacing character of signals, holding means for disabling said relay means upon the occurrence of outgoing transmission and for a predetermined interval after the end of any spacing signal of outgoing transmission, and break signal detecting means operable upon response of said receiving circuit to a spacing signal continuing or occurring after the end of said interval for rendering said relay means and consequently said printer responsive to said spacing signal despite outgoing transmission.

8. In a telegraph station, a signal receiving circuit responsive to outgoing signal transmission and incoming signal transmission, signal generating means for effecting outgoing transmission, a teletypewriter printer, signal responsive relay means for operating said printer in accordance with the marking and spacing character of signals, holding means for disabling said relay means upon the occurrence of outgoing transmission and for a predetermined interval after the end of any spacing signal of outgoing transmission, and break signal detecting means operable upon response of said receiving circuit to a spacing signal continuing or occurring after the end of said interval for rendering said relay means and consequently said printer responsive to said spacing signal despite continued operation of said signal generating means.

9. In a telegraph system, a station having a signal receiving circuit responsive to outgoing signal transmission and incoming signal transmission, a transmission channel, signal generating means for effecting outgoing transmission, a teletypewriter printer, signal responsive relay means for operating said printer in accordance with the marking and spacing character of signals, holding means for disabling said relay means upon the occurrence of outgoing transmission for an interval after the end of any spacing signal at least as long as the echo time of said channel to outgoing spacing signals, and break signal detecting means operable upon response of said receiving circuit to a spacing signal continuing or occurring after the end of said interval for rendering said relay means and consequently said printer responsive to said spacing signal despite continued operation of said signal generating means.

10. In a telegraph station, a signal receiving circuit responsive to outgoing signal transmission and incoming signal transmission, a teletypewriter printer, signal responsive relay means for operating said printer in accordance with the marking and spacing character of signals, holding means for disabling said relay means upon the occurrence of outgoing signal transmission, break signal detecting means operable upon response of said receiving circuit to a spacing signal exceeding a predetermined duration for rendering said relay means and consequently said printer responsive to said spacing signal despite outgoing transmission, and locking means for maintaining said relay means in the spacing signal condition for a predetermined interval independently of the duration of the received spacing signal.

11. In a telegraph station, a signal receiving circuit responsive to outgoing signal transmission and incoming signal transmission, signal generating means for effecting outgoing transmission, a teletypewriter printer, signal responsive relay means for operating said printer in accordance with the marking and spacing character of signals, holding means for disabling said relay means upon the occurrence of outgoing transmission and for a predetermined interval after the end of any spacing signal of outgoing transmission, break signal detecting means operable upon response of said receiving circuit to a spacing signal continuing or occurring after the end of said interval for rendering said relay means and consequently said printer responsive to said spacing signal despite continued operation of said signal generating means, and means controlled by said relay means upon response to said spacing signal for effecting outgoing transmission of a steady marking signal despite continued operation of said signal generating means.

12. In a telegraph station, a signal receiving circuit responsive to outgoing signal transmission and incoming signal transmission comprising marking and spacing conditions, a teletypewriter printer, signal responsive relay means for operating said printer in accordance with the marking and spacing character of signals, signal detecting means for impressing different operating voltage conditions on said relay means for said marking and spacing signal conditions, non-discriminatory signal detecting means for impressing an enabling voltage condition on said relay means in response to both said marking and spacing signal conditions, and still other signal detecting means having discriminatory attributes for producing a break signal registering voltage condition in response to a spacing signal condition only.

13. In a telegraph system including a transmission channel normally having no current flowing therein, intelligence signal transmission means for impressing marking and spacing currents having different characteristics upon said channel, and means responsive to initiation of intelligence signals for impressing on said channel a preliminary current having a different characteristic from that of the first current of said intelligence signal transmission.

References Cited in the file of this patent

UNITED STATES PATENTS

| Number | Name | Date |
|---|---|---|
| 2,455,724 | Bacon | Dec. 7, 1948 |
| 2,528,120 | Davey | Oct. 31, 1950 |